July 28, 1942.   H. J. FINDLEY   2,291,543
AUTOMOBILE AIR CONDITIONING SYSTEM
Filed Jan. 11, 1941
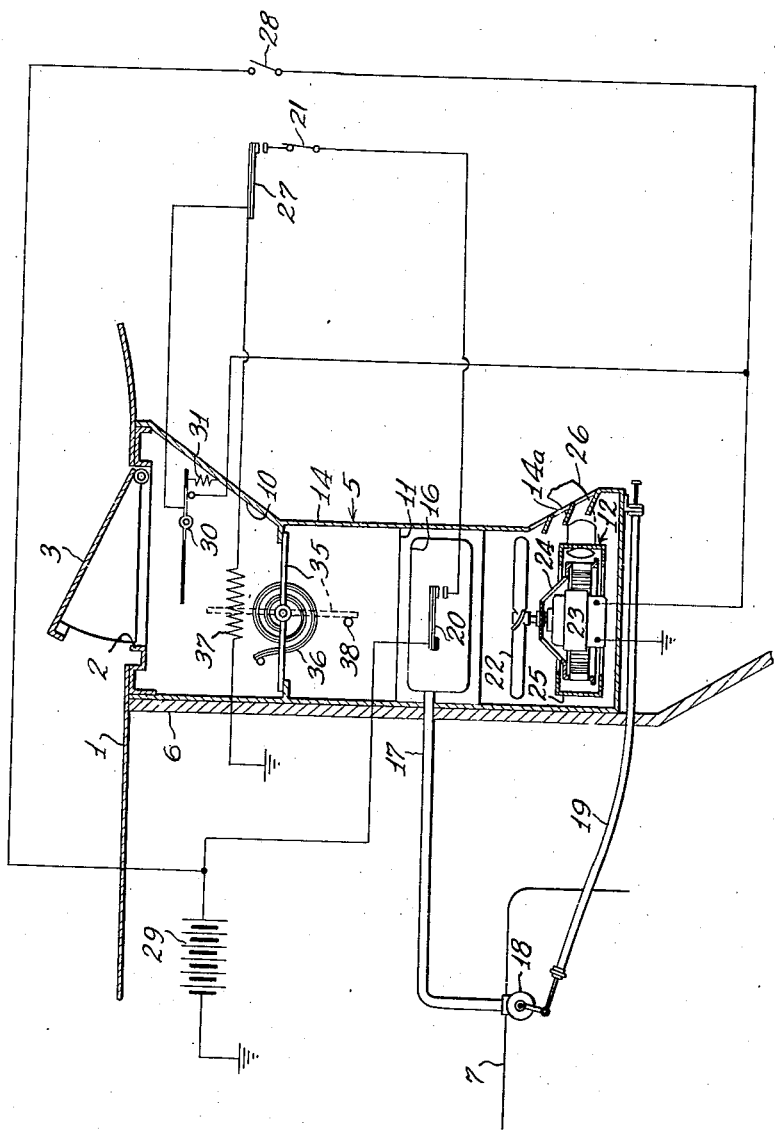
INVENTOR.
Howard J. Findley
BY John F. Stark
ATTORNEY.

Patented July 28, 1942

2,291,543

UNITED STATES PATENT OFFICE 2,291,543

AUTOMOBILE AIR CONDITIONING SYSTEM

Howard J. Findley, Shaker Heights, Ohio, assignor to Eaton Manufacturing Company, Cleveland, Ohio, a corporation of Ohio Application January 11, 1941, Serial No. 374,031

6 Claims. (Cl. 237—2)

This invention relates to vehicle heat-exchangers in general, and more particularly, concerns a vehicle heat-exchanger and ventilating construction having a control circuit therefor for automatic operation of the same.

Among the objects of the invention is the provision of an automobile heating and ventilating construction having improved circuit means for automatic control of the same; the provision in a vehicle heating and ventilating system, as above described, of thermo-responsive means which will automatically control the supply of fresh air to the vehicle body in accordance with the temperature of the heat-exchange medium circulating through the heat-exchanger; the provision in a vehicle heating and ventilating system, as above described, in which a pressure responsive switch in the fresh air supply means is operative, below selected static head pressures thereon caused by forward motion of the vehicle, to control operation of air impelling means of the heat-exchanger to secure adequate air movement therethrough; the provision of a novel and improved construction and mode of operation of devices for heating and ventilating automobile bodies, as above described, by means of a thermo-responsive element in the vehicle passenger compartment to control operation of the air impelling means and/or the damper governed fresh air supply means.

Another object of the invention is the provision of a novel and improved vehicle body heating and ventilating system having an automatic control circuit therefor, as above described, including air impelling means having a defroster blower incorporated therein which may be controlled by manual switch means when necessary, irrespective of the automatic circuit means.

Further and other objects and advantages of the invention reside in the novel combination and arrangement of parts hereinafter described, when considered in conjunction with the accompanying drawing forming a part of this specification and pointed out with particularity in the appended claims.

Having reference to the drawing there is shown a longitudinal sectional view through a portion of a vehicle body and a heating system therefor somewhat diagrammatically shown with the automatic circuit means superimposed thereon.

Referring to the drawing by reference characters a vehicle cowl 1, has the usual ventilator opening 2 and adjustable closure 3 therefor. A heat-exchanger, generally designated 5, is disposed in longitudinal position beneath the cowl opening 2 and adjacent a partition 6, separating the vehicle passenger compartment from the engine compartment and in which is shown a portion of the vehicle engine 7. The heat-exchanger 5 consists generally of three sections namely, a fresh air supply means 10, a core element 11, and an air impelling unit 12, all of which are integrated by the shell or housing 14 enveloping the same. In this instance the fresh air supply means 10 simply consists of the open upper end section of the casing 14 which is expanded to surround the cowl opening 2 and sealed to the underside of the cowl in any well known manner. In response to forward motion of the vehicle, when the ventilator closure 3 is opened, fresh air from outside the vehicle will be deflected into the cowl opening 2 by the underside of said closure and forced through the casing 14 and core element 11 therein.

The heat-exchange or core element 11, in the casing 14, is of the circulating fluid type having a header tank on either end thereof, of which the tank 16 forms the inlet side thereof, and has a supply pipe 17 joined thereinto and connected to the vehicle engine 7 for reception of heat-exchange medium therein. A valve 18 is interposed between the supply pipe 17 and the engine for regulation of fluid flow therethrough, and may be conveniently actuated by a Bowden wire control 19 extended therefrom through the partition 6 to some convenient point accessible from the driver's position. A manual switch 21 is used to initially close the heater circuit. Mounted upon the header tank 16 is a thermoresponsive element or bi-metal thermostat 20, which is sensitive, below a predetermined temperature, say 90° F., to the heat content of the heat-exchange medium flowing in the core tank, for primarily shutting off the air impeller 12 of the heat-exchanger regardless of the remaining circuit demands in which it is included, as will be presently described.

Below the heat-exchange element the air impeller unit 12 is arranged to received tempered air therefrom and deliver it through the casing discharge openings 14a direct to the passenger compartment. The air impeller unit 12 consists of a propeller fan 22 mounted upon the shaft of a driving motor 23, and a centrifugal fan 24 also mounted upon the same end of the common shaft but concentrically surrounding the motor and housed within a blower casing 25.

It will be apparent that operation of the propeller fan 22 will move air axially from the core element and a portion thereof will be delivered down and out the casing discharge openings 14a, while the remaining portion will be drawn by the concurrent operation of the centrifugal blower fan 24 through openings in the perforated hub thereof into the center of the blower housing and discharged tangentially therefrom through delivery outlet 26 where it may be piped to the inner surface of the vehicle windshield for defrosting purposes when necessary. A thermo-responsive element or bi-metal thermostat 27, which is preferably located in the vehicle compartment affords automatic control of the fan motor 23 operation at any selected temperature once the manual switch 21 is closed, as shown; and a second manual switch 28 shunted around the thermostat between a battery 29 and the motor 23, as shown, permits operation of the defroster fan regardless of the circuit demands for heat.

In the fresh air supply means 10, of the heater casing 14, is a wind or pressure actuated switch 30 pivotally secured to a wall thereof and extending into the air channel therethrough. The wind switch is balanced for normal horizontal position by the return spring 31, and arranged to complete a circuit from the fan motor 23 to the battery 29 when at rest. That is to say, when forward movement of the vehicle is fast enough to cause a predetermined static head of fresh air to be deflected into the cowl opening it acts upon the windswitch to open the contacts thereof breaking the circuit from the fan motor to the battery; but when the speed of the vehicle is not great enough, or at rest, to supply sufficient air through the heat-exchange device for vehicle heating the windswitch returns to its normal horizontal position and energizes the fan motor to provide adequate air flow through the core element. After the vehicle has reached sufficient speed the cycle is again repeated. It will be noted, of course, that when the thermostat 27 has been satisfied in its heat demand the windswitch is ineffective to energize the fan motor 23, as shown by the circuit hook-up.

Beyond the windswitch 30 and above the core element 11 a damper valve plate 35, pivotally journalled in opposite walls of the casing, is disposed transversely across the throat in the fresh air supply means 10 of the heater casing 14 to shut off the air flow therethrough. The bi-metal spiral spring or solenoid 36 may be used to control the operation of the valve from open to closed position according to the circuit condition. That is to say, regardless of the vehicle body thermostat 27 calling for heat the damper valve remains closed until the thermo-responsive or limit control 20 on the core tank is energized by the water temperature therin, when it completes the circuit and allows the valve to open. A resistance 37 in series with the limit control regulates operation of the damper valve by the radiation of heat to the spiral spring 36 when the circuit is energized, and a stop 38 limits the range of movement of the damper valve. It will be understood that other means may be employed to operate the damper valve such as a spring balanced mechanism for constant volume of air irrespective of speed; or a vacuum cylinder responsive to predetermined static pressures thereagainst, the present device being shown for purposes of illustration only, and any spring balanced or pressure responsive element controlling the electrical circuit in conjunction therewith is within the contemplation of this invention.

The use and operation of the present heater and ventilating system, in conjunction with an automatic circuit therefor as shown, is as follows:

When starting the cold automobile assuming the cowl vent is open, the body thermostat 27 calls for heat but the damper valve 35 remains closed until the thermo-responsive limit control 20 on the header tank of the core element is energized by the heat-exchange medium therein reaching the predetermined temperature. Upon arriving at the selected temperature of the operating fluid the circuit from the battery means through the thermo-responsive element 20 to the damper valve 35 is completed, and the energized control 36 thereof, causes it to move to open position thereby permitting a supply of fresh air to be heated to enter and move through the core element for delivery through casing openings 14a in tempered condition into the passenger compartment. Under the above operating conditions, the rotation of the fan motor will be controlled by the speed of the vehicle, i. e., when insufficient fresh air is deflected into the supply means 10 the windswitch being at rest will complete a circuit from the battery through the thermostat 27 now closed, to the motor 23; and, when the vehicle speed is sufficient to cause the fresh air supply to angularly deflect the windswitch, current flow to the motor will be automatically interrupted. When the predetermined operating temperature of the thermostat 27 has been reached the circuit therethrough is open or broken and the parts dependent for operation thereon return to their previous position or at rest until a further demand is made by the thermostat for heat. Since it may be necessary, under certain operating conditions, to defrost or defog the vehicle windshield, when the heating demands of the passenger compartment have been met, or on mild days when it is not desired to operate the heat-exchanger, the separate manual switch 28, shunted around the several automatic means, provides a direct normally open circuit to the fan motor 23 for energizing the same to operate the blower fan 24. The water flow valve 18 meters or throttles the volume of fluid flow through the core element to control the temperature of the air delivery to the passenger compartment, and this is of considerable value to compensate for variable outside weather conditions or the volume of fresh air supplied to the core element for tempering.

From the foregoing disclosures it will be apparent there has been described a novel heating and ventilating system controlled by an automatic operating means therefor joined in an electrical control circuit which accomplishes, among other things, the objects and advantages of the invention first enumerated. However, it is not intended to be limited to the specific embodiment thereof, which has been described somewhat in detail for purposes of illustration only, as various modifications will be forthcoming to those skilled in the art to which this invention relates as defined by the spirit and substance of the scope of the following claims.

I claim:

1. In a vehicle passenger compartment air-tempering and ventilating structure having a fresh air supply element, a heat exchange element, an air impelling element adjacent thereto arranged to move air therethrough including a battery energizing means, and a casing integrating said element for delivery of conditioned air to the passenger compartment; the combination with an electrical control circuit including said battery energizing means, said air impelling element and a windswitch, said windswitch in said circuit disposed in said fresh air supply element and responsive to pressure therein for effecting operation of said air impelling element, of a damper valve in said casing between said windswitch and heat-exchange element arranged to close off communication of air thereto, a thermo-responsive element in said circuit disposed on said heat-exchange element, means in said circuit to render ineffective operation of said damper valve prior to operation of said thermo-responsive element, said thermo-responsive means connected in series in said circuit and operative above a selected temperature of a heat-exchange medium to effect operation of said damper valve and windswitch, whereby said thermo-responsive means primarily governs the operative condition of said circuit.

2. In a vehicle passenger compartment air-tempering and ventilating structure having a fresh air supply element, a heat-exchange element, an air impelling element adjacent thereto arranged to move air therethrough including a battery energizing means, and a casing integrating said elements for delivery of conditioned air to the passenger compartment; the combination with an electrical control circuit including said battery energizing means, said air impelling element and a windswitch, said windswitch in said circuit disposed in said fresh air supply element and responsive to pressure therein for effecting operation of said air impelling element, of a damper valve in said casing between said windswitch and heat-exchange element arranged to close off communication of air thereto, a thermo-responsive element in said circuit disposed on said heat-exchange element, means in said circuit to render ineffective operation of said damper valve prior to operation of said thermo-responsive element, and said thermo-responsive means connected in series in said circuit and operative above a selected temperature of a heat-exchange medium to effect operation of said damper valve and windswitch, whereby upon said thermo-responsive means being rendered operative said damper valve is caused to open to permit air to be heated to move through said heat-exchange element to the passenger compartment.

3. In a vehicle passenger compartment air-tempering and ventilating structure having a fresh air supply element, a heat-exchange element, an air impelling element adjacent thereto arranged to move air therethrough including a battery energizing means, and a casing integrating said elements for delivery of conditioned air to the passenger compartment; the combination with an electrical control circuit including said battery energizing means, said air impelling element and a windswitch, said windswitch in said circuit disposed in said fresh air supply element and responsive to pressure therein for effecting operation of said air impelling element, of a damper valve in said casing between said windswitch and heat-exchange element arranged to close off communication of air thereto, a thermo-responsive element in said circuit disposed on said heat-exchange element, means in said circuit to render ineffective operation of said damper valve prior to operation of said thermo-responsive element, said thermo-responsive means connected in series in said circuit and operative above a selected temperature of a heat-exchange medium to effect operation of said damper valve and windswitch, whereby upon said thermo-responsive means being rendered operative said damper valve is caused to open to permit air to be heated to move through said heat-exchange element to the passenger compartment, and said windswitch normally interrupting the electrical circuit to said air impelling means when adequate air flow is supplied to the heat-exchanger above a selected vehicle speed.

4. In a vehicle passenger compartment air-tempering and ventilating structure having a fresh air supply element, a heat-exchange element, an air impelling element adjacent thereto arranged to move air therethrough including a battery energizing means, and a casing integrating said elements for delivery of conditioned air to the passenger compartment; the combination with an electrical control circuit including said battery energizing means, said air impelling element and a windswitch, said windswitch in said circuit disposed in said fresh air supply element and responsive to pressure therein for effecting operation of said air impelling element, of a damper valve in said casing between said windswitch and heat-exchange element arranged to close off communication of air thereto, a thermo-responsive element in said circuit disposed on said heat-exchange element, means in said circuit to render ineffective operation of said damper valve prior to operation of said thermo-responsive element, said thermo-responsive means connected in series in said circuit and operative above a selected temperature of a heat-exchange medium to effect operation of said damper valve and windswitch, whereby upon said thermo-responsive means being rendered operative said damper valve is caused to open to permit air to be heated to move through said heat-exchange element to the passenger compartment, said windswitch normally interrupting the electrical circuit to said air impelling means when adequate air flow is supplied to the heat exchanger above a selected vehicle speed, and thermostatic means in said circuit located in the passenger compartment operative automatically above selected air temperatures for interrupting current flow to the air impelling means.

5. In a vehicle passenger compartment air tempering and ventilating structure having a fresh air supply element, a heat-exchange element, an air impelling element adjacent thereto arranged to move air therethrough inculding a battery energizing means, and a casing integrating said elements for delivery of conditioned air to the passenger compartment; the combination with an electrical control circuit including said battery energizing means, said air impelling element and a bi-metal thermostat, said bi-metal thermostat located in the passenger compartment and responsive below a selected air temperature therein to extend an operative condition of said circuit, of a thermo-responsive means in said circuit located on said heat-exchange element and operative above a selected temperature of a heat-exchange medium therein, and a damper valve means in said circuit located in said casing between said fresh air supply source and heat-exchange element and cooperating to automatically control air flow therethrough subsequent to operation of said thermo-responsive means, and said electrical circuit arranged to effect operation of said air impelling means and so coordinated in the control thereof that the closed operative condition thereof is primarily governed by energization of the thermo-responsive means on the heat-exchange element, and interrupted by said bi-metal thermostat in the passenger compartment above said selected operative air temperature therein.

6. In a vehicle passenger compartment air tempering and ventilating structure having a fresh air supply element, a heat-exchange element, an air impelling element adjacent thereto arranged to move air therethrough including a battery energizing means, and a casing integrating said elements for delivery of conditioned air to the passenger compartment; the combination with an electrical control circuit including said battery energizing means, said air impelling element and a bi-metal thermostat, said bi-metal thermostat located in the passenger compartment and responsive below a selected air temperature therein to extend an operative condition of said circuit, of a thermo-responsive means in said circuit located on said heat-exchange element and operative above a selected themperature of a heat-exchange medium therein, and a damper valve means in said circuit located in said casing between said fresh air supply source and heat-exchange element and cooperating to automatically control air flow therethrough subsequent to operation of said thermo-responsive means, said electrical circuit arranged to effect operation of said air impelling means and so coordinated in the control thereof that the closed operative condition thereof is primarily governed by energization of the thermo-responsive means on the heat-exchange element, and interrupted by said bi-metal thermostat in the passenger compartment above said selected operative air temperature, and said air impelling means including a blower fan arranged to force tempered air to the vehicle windshield at will by means of a manually operable switch means in a circuit shunted around the automatic controls of said electrical control circuit for energizing said air impeller regardless of the automatic adjustment setting thereof.

HOWARD J. FINDLEY.